（12）United States Patent
Shepard et al.

(10) Patent No.: US 9,784,827 B2
(45) Date of Patent: Oct. 10, 2017

(54) FOREIGN OBJECT DEBRIS DETECTION SYSTEM AND METHOD

(71) Applicant: BAE Systems plc, London (GB)

(72) Inventors: David John Shepard, Essex (GB); John Michael Wood, Essex (GB)

(73) Assignee: BAE Systems plc (GB)

( * ) Notice: Subject to any disclaimer, the term of this patent is extended or adjusted under 35 U.S.C. 154(b) by 0 days.

(21) Appl. No.: 15/329,367

(22) PCT Filed: Jul. 28, 2015

(86) PCT No.: PCT/GB2015/052175
§ 371 (c)(1),
(2) Date: Jan. 26, 2017

(87) PCT Pub. No.: WO2016/016633
PCT Pub. Date: Feb. 4, 2016

(65) Prior Publication Data
US 2017/0219699 A1 Aug. 3, 2017

(30) Foreign Application Priority Data
Aug. 1, 2014 (GB) .................................. 1413687.3

(51) Int. Cl.
*G01S 13/53* (2006.01)
*G01S 13/536* (2006.01)
(Continued)

(52) U.S. Cl.
CPC ............ *G01S 13/536* (2013.01); *G01S 7/415* (2013.01); *G01S 2013/0245* (2013.01)

(58) Field of Classification Search
CPC . G01S 13/536; G01S 7/415; G01S 2013/0245
See application file for complete search history.

(56) References Cited

U.S. PATENT DOCUMENTS

| 4,275,396 A | 6/1981 | Jacomini |
| 4,684,950 A | 8/1987 | Long |

(Continued)

FOREIGN PATENT DOCUMENTS

| DE | 4220429 A1 | 1/1994 |
| DE | 10351154 B3 | 1/2005 |

(Continued)

OTHER PUBLICATIONS

International Preliminary Report on Patentability for Appl No. PCT/GB2015/052175 dated Feb. 7, 2017, 9 Pages.

(Continued)

*Primary Examiner* — John B Sotomayor
(74) *Attorney, Agent, or Firm* — Maine Cernota & Rardin

(57) ABSTRACT

A method for suppressing the Jet Engine Modulation (JEM) clutter signal returns from compressor blades (26) in data sampled by a system for Foreign Object Debris (FOD) detection in the air intake (30) of a turbine assembly, the method comprising the steps of: (a) identifying in the data the start sample position and length in samples of a single complete shaft rotation; and (b) subtracting from a current rotation dataset the samples from a comparison rotation dataset corresponding to another complete single shaft rotation.

20 Claims, 5 Drawing Sheets

(51) Int. Cl.
*G01S 7/41* (2006.01)
*G01S 13/02* (2006.01)

(56) References Cited

U.S. PATENT DOCUMENTS

| | | | |
|---|---|---|---|
| 5,539,412 | A | 7/1996 | Mendelson |
| 7,483,800 | B2 | 1/2009 | Geisheimer et al. |
| 7,969,165 | B2 | 6/2011 | Bosselmann et al. |
| 9,028,219 | B2 * | 5/2015 | Clark ............... F01D 5/147 416/229 A |
| 2008/0255799 | A1 | 10/2008 | Pfeifer et al. |
| 2008/0273983 | A1 * | 11/2008 | Clark ............... F01D 5/147 416/223 A |
| 2009/0243628 | A1 | 10/2009 | Andarawis |
| 2012/0242351 | A1 | 9/2012 | Hochreutiner et al. |
| 2017/0219699 | A1 * | 8/2017 | Shepard ............ G01S 13/536 342/159 |

FOREIGN PATENT DOCUMENTS

| | | | | |
|---|---|---|---|---|
| EP | 1754861 | A2 | 2/2007 | |
| EP | 2345909 | A1 | 7/2011 | |
| EP | 2538199 | A2 | 12/2012 | |
| GB | 2322987 | A | 9/1998 | |
| GB | 2448886 | A * | 11/2008 | ............ F01D 5/147 |
| GB | 201413687 | * | 9/2014 | ............ G01S 7/415 |
| GB | 2528880 | A * | 2/2016 | ............ G01S 7/415 |
| WO | 2008036136 | A2 | 3/2008 | |

OTHER PUBLICATIONS

International Preliminary Report on Patentability for Appl No. PCT/GB2015/052174 dated Feb. 7, 2017, 8 Pages.
Shepard D J et al: "Foreign object detection using radar", Aerospace Conference proceedings, 2000 IEEE Mar. 18-25, 2000, Piscataway, NJ, USA, IEEE, vol. 6, Mar. 18, 2000, pp. 43-48, XP010515982, ISBN: 978-0-7803-5846-1.
International Search Report and Written Opinion of PCT/GB2015/052175 dated Sep. 17, 2015, 13 pages.
Great Britain Search Report of Application No. GB1413687.3 dated Apr. 28, 2015, 3 pages.
Great Britain Search Report of Application No. GB1413687.3 dated Feb. 16, 2015, 5 pages.
International Search Report and Written Opinion of PCT/GB2015/052175, dated Sep. 17, 2015, 13 pages.
Great Britain Search Report of Application No. GB14136903.7 dated Feb. 16, 2015, 3 pages.
"Meggitt Sensing Systems, 2013, Blade vibration monitoring system", vibro-meter.com, [online], Available from http://vibro-meter.com/pdf/prod-development/Blade_vibration_monitoring_systems.pdf [Accessed Feb. 16, 2015].
Statistical Signal and Array Processing [online] 2000, Chen, "Analysis of Radar Micro-Doppler Signature With Time-Frequency Transform", Available from: http://ieeexplore.ieee.org/xpls/abs_all.jsp?arnumber=870167 [Accessed Feb. 16, 2015] pp. 463 to 466.
International Search Report and Written Opinion of PCT/GB2015/052174 dated Sep. 21, 2015, 12 pages.
Schicht A et al: "Absolute Phase-based Distance Measurement for Industrial Monitoring Sustems", IEEE Sensors Journal, IEEE Service Center, New York, NY, U.S., vol. 9, No. 9, Sep. 1, 2009, pp. 1007-1013, XP011271201, ISSN: 1530-437X, DOI: 10.1109/JSEN.2009.2025582 abstract; figures 2, 6, 8.

\* cited by examiner

FOREIGN OBJECT DEBRIS DETECTION SYSTEM AND METHOD

RELATED APPLICATIONS

This application is a National Phase application filed under 35 USC §371 of PCT Application No. PCT/GB2015/052175 with an International filing date of Jul. 28, 2015 which claims priority of GB Patent Application 1413687.3 filed Aug. 1, 2014. Each of these applications is herein incorporated by reference in their entirety for all purposes.

FIELD OF THE INVENTION

This invention relates to Foreign Object Debris (FOD) detection and, more particularly, but not necessarily exclusively, to a system and method which uses radar for FOD detection and/or classification in a turbine assembly having rotating blades.

BACKGROUND

Aircraft jet engines can be damaged by Foreign Object Debris (FOD) sucked into the air intake. Large objects, for example a large bird strike, can cause significant changes that can be detected by the aircraft monitoring systems, such as shaft vibration. Smaller objects however, such as pebbles or bolts can cause damage to a blade that is barely visible to the eye but weakens the blade such that under continued use the stresses result in blade failure. A method for detecting that FOD has been ingested would assist in maintenance.

Systems have been proposed which employ radar for FOD detection. Shephard, Tait, King, 'Foreign Object Detection Using Radar', IEEE Aerospace Conference 2000, describes such a system where radar antennas are mounted within the air intake. As the FOD is moving it can be detected by the radar using Doppler processing. A problem for such systems is that the jet engine blades are large and very fast moving. The Jet Engine Modulation (JEM) of the radar signal reflected from the blades is spread across a wide range of Doppler frequencies. The much smaller signal return from the FOD has to be detected in the presence of this JEM signal.

Standard radar techniques can be used to mitigate the effects of JEM. The antenna can be made highly directional so that the radar energy is directed away from the engine blades. Also, radar range processing can be used to suppress ranges corresponding to the distance from the antenna to the blades. However the JEM signal is very much larger than the FOD signal and will still be received through both the antenna sidelobes and the range sidelobes and so these techniques are not sufficient to adequately suppress the JEM.

SUMMARY OF THE INVENTION

Embodiments of the present invention seek to address at least some of these issues and, in accordance with one aspect of the present invention, there is provided a method for suppressing the Jet Engine Modulation (JEM) clutter signal returns from compressor blades in data sampled by a system for Foreign Object Debris (FOD) detection in the air intake of a turbine assembly, the method comprising the steps of:

(a) identifying in the data the start sample position and length in samples of a single complete shaft rotation; and (b) subtracting from a current rotation dataset the samples from a comparison rotation dataset corresponding to another complete single shaft rotation.

In one exemplary embodiment, said subtracting step comprises subtracting from a current rotation dataset the samples from a comparison rotation dataset corresponding to a previous complete single shaft rotation.

The identifying step may use a once per revolution pulse provided by an aircraft engine monitoring system as a reference to determine the position and length of a complete shaft rotation.

Alternatively, in the identifying step, the length of the current shaft rotation may be determined by:

(a) selecting a reference section of data starting at the start of the current shaft rotation;

(b) stepping the reference section forward through the sampled data and at each step determining a measure of similarity; and (c) identifying the start of the next rotation by finding the sample number corresponding to the maximum measure of similarity.

The step of stepping the reference section forward may be implemented by a correlation. In the step of stepping the reference section forward, a once per revolution pulse provided by the aircraft engine monitoring system may be used to reduce the range of samples over which to determine the measure of similarity.

Alternatively, in the step of stepping the reference section forward, a prediction based on the number of samples in previous rotations may be used to reduce the range of samples over which to determine the measure of similarity.

The length of the comparison rotation dataset may be re-sampled to be substantially the same length as the current rotation before performing said subtracting step. Both the current rotation dataset and the comparison rotation dataset may be re-sampled to substantially the same length. In this case, the resulting JEM suppressed data may be re-sampled to the original length.

In one exemplary embodiment, the comparison rotation dataset comprises the average of data from multiple rotations. In this case, the multiple rotations may be re-sampled to be substantially the same length before averaging.

In a method according to one exemplary embodiment of the invention, prior to said step of identifying in the data the start sample position and length in samples of a single complete shaft rotation, both the current rotation dataset and the comparison rotation dataset may be converted to the frequency domain.

In accordance with another aspect of the present invention, there is provided method for suppressing the Jet Engine Modulation (JEM) clutter signal returns from compressor blades in data sampled by a system for Foreign Object Debris (FOD) detection in the air intake of a turbine assembly, the method comprising the steps of:

(a) identifying in the data the start sample position and length in samples of a single complete shaft rotation; and (b) converting the data for the single complete shaft rotation or multiples of a single shaft rotation to the frequency domain; and (c) setting dominant JEM harmonic lines to zero or a mean value.

The number of samples in a complete rotation may be determined by:

(a) converting a section of the data to the frequency domain and taking the magnitude;

(b) determining the frequency of the first large spectral line; and (c) calculating from the frequency the corresponding number of time samples for a complete rotation.

The method may further comprise the steps of:

(a) determining the length in samples of a single shaft rotation and thereby obtain the corresponding frequency in the frequency domain of the JEM lines which are at integer multiples of the shaft rotation frequency;

(b) converting consecutive sections of the data to the frequency domain and taking their magnitude; and (c) setting the spectrum to zero or to a value which is the average over time at that frequency at the frequencies of the JEM spectral lines.

In accordance with yet another aspect of the present invention, there is provided A method for suppressing the Jet Engine Modulation (JEM) clutter signal returns from compressor blades in data sampled by a radar designed to detect Foreign Object Foreign Debris (FOD) sucked into the engine air intake, method comprising the steps of:

(a) determining, in the frequency domain, the frequency of the JEM lines which are at integer multiples of the shaft rotation frequency;

(b) converting consecutive sections of the data to the frequency domain and taking their magnitude; and (c) providing a thresholding function and applying said thresholding function to said data, wherein said thresholding function is configured and/or said frequency spectrum is set so as to prevent said JEM frequencies from being detected by said thresholding function.

The method may comprise the step of setting the frequency spectrum to zero or to a value which is the average over time at that frequency at the frequencies of the JEM spectral lines.

In accordance with yet another aspect of the present invention, there is provided a method for suppressing the Jet Engine Modulation (JEM) clutter signal returns from compressor blades in data sampled by a radar designed to detect Foreign Object Debris (FOD) sucked into the engine air intake comprising the steps of:

(a) determining, in the frequency domain, the frequency of the JEM lines which are at integer multiples of the shaft rotation frequency;

(b) calculating based on the frequency of the JEM lines a comb notch filter where the notches in the frequency response of the filter are aligned with the JEM harmonic lines; and (c) applying the notch filter to the data.

The method may further comprise, prior to the step of calculating the comb notch filter, the step of resampling the data so that each engine shaft rotation is represented in the same number of samples.

The step of determining in the frequency domain the frequency of the JEM lines which are at integer multiples of the shaft rotation frequency comprises determining by measurement in the frequency domain of the data the frequency of the JEM lines.

Alternatively, the step of determining, in the frequency domain, the frequency of the JEM lines which are at integer multiples of the shaft rotation frequency comprises determining the length in samples of a single shaft rotation and thereby obtain the corresponding frequency in the frequency domain of the JEM lines.

Aspects of the present invention extend to a module for suppressing the Jet Engine Modulation (JEM) clutter signal returns from compressor blades in data sampled by a system for Foreign Object Debris (FOD) detection in the air intake of a turbine assembly, the module comprising one or more processors configured, in use, to perform the method defined above.

Aspects of the invention extend further to a system for Foreign Object Debris (FOD) detection in the air intake of a turbine assembly, comprising at least one antenna for obtaining data signals returned from the compressor blades of said turbine assembly, a sampling device for sampling said data signals to obtain sampled data, and a module for suppressing the JEM clutter signal as defined above.

According to yet another aspect of the present invention, there is provided an engine health diagnostic system for a turbine assembly, said engine health diagnostic system comprising a blade monitoring system for monitoring at least one characteristic of one or more blades of said turbine assembly, and a FOD detection system as defined above.

The blade monitoring system may comprise at least one antenna directed at the compressor blades of said turbine assembly, and said FOD detection system comprises at least one antenna directed into the air intake of the turbine assembly. The at least one antenna of said blade monitoring system and said at least one antenna of said FOD detection system may be mounted back-to-back in substantially the same location at the entrance to the engine of said turbine assembly.

Alternatively, the at least one antenna of said blade monitoring system and said at least one antenna of said FOD detection system may be embodied in a single phased array antenna mounted at the entrance to the engine of said turbine assembly.

BRIEF DESCRIPTION OF THE DRAWINGS

These and other aspects of the present invention will be apparent from the following description of the present invention, embodiments of which will now be described by way of examples only and with reference to the accompanying drawings, in which.

DETAILED DESCRIPTION

Figure 1:
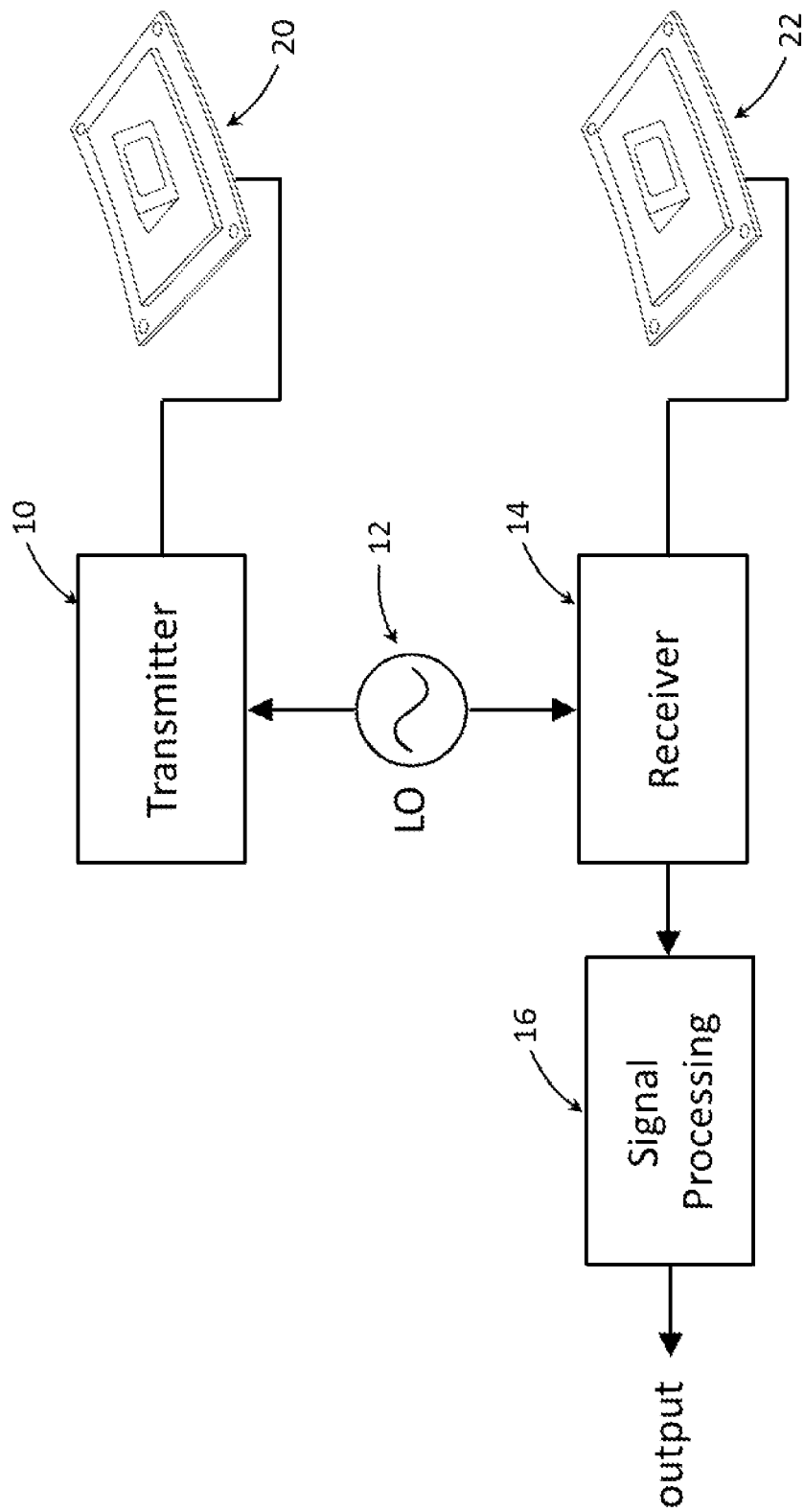
FIG. 1 is a schematic block diagram of an FOD detection system according to an exemplary embodiment of the present invention.

Referring to FIG. 1 of the drawings, a FOD detection system according to an exemplary embodiment of the present invention comprises a continuous wave (CW) transmitter 10, and a transmit antenna 20, shown with mounting plate. The system further comprises a receive antenna 22, a receiver 14 for receiving returned signals including sampling by analogue to digital converters (ADCs), and a signal processing module 16 and a local oscillator 12.

The signal processing module 16 first performs JEM suppression to generate a usable dataset within which an item of FOD can be reliably detected.

After JEM suppression the FOD detection may be performed by first converting consecutive sections of the data to the frequency domain to form a data set of frequency against time and then applying a threshold to the data. Alternatively detection can also be performed by applying a threshold in the time-domain.

Additionally the signal processing performs velocity profiling for determining the velocity profile of a detected item of FOD, radar cross-section (RCS) measurement for determining the cross-section of a detected item of FOD, and a classification for classifying a detected item of FOD as damaging or non-damaging using the results from the velocity profiling and the RCS measurement.

Figure 2A:
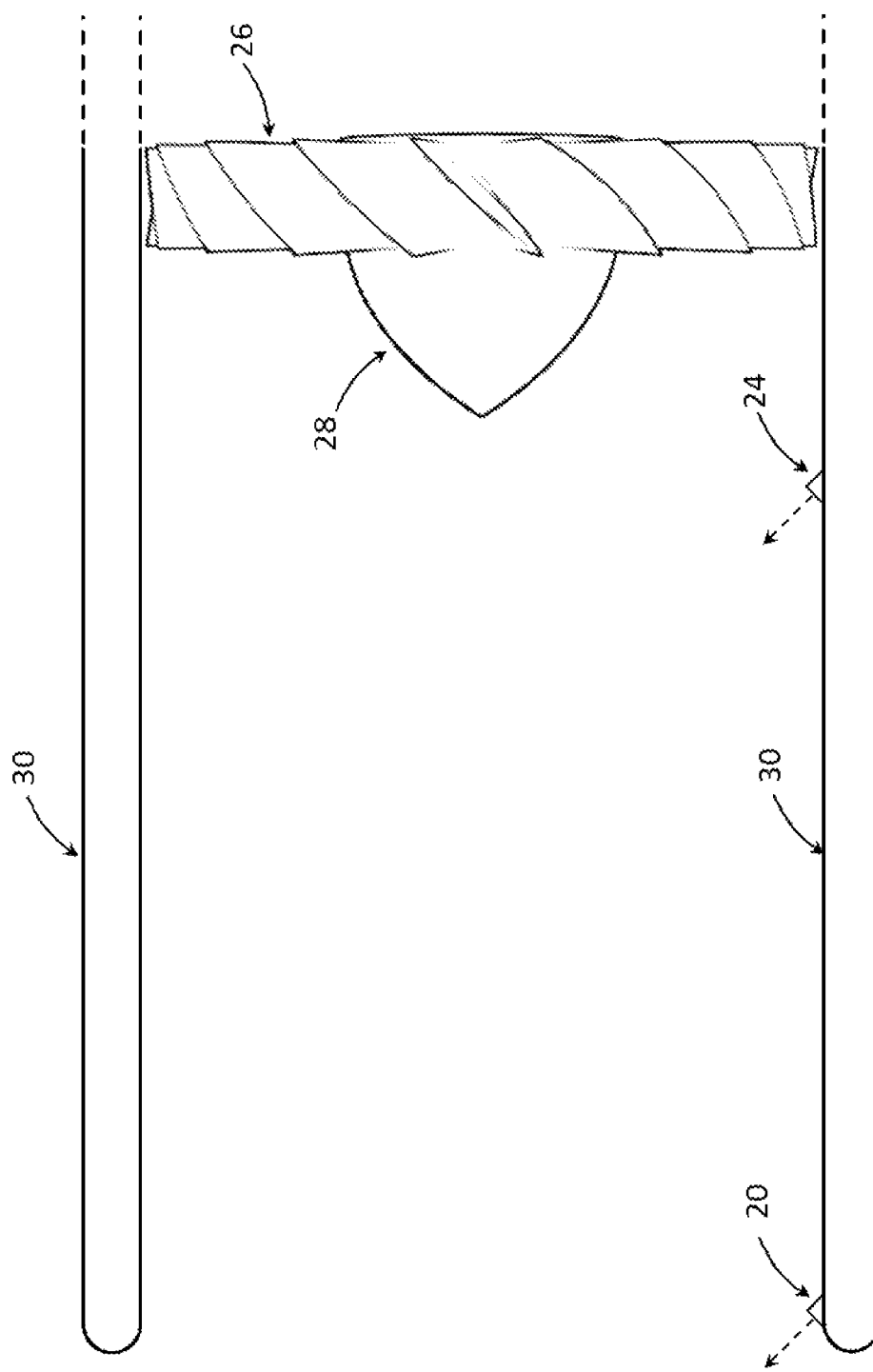
FIG. 2A is a schematic side view of a typical air intake installation for a turbine assembly, illustrating radar sensors positioned for use in a FOD detection system according to an exemplary embodiment of the present invention (diagram uses components from CAD model 'Jet Engine' by Gerry Hamilton under Creative Commons 3.0 attribution license)
Figure 2B:
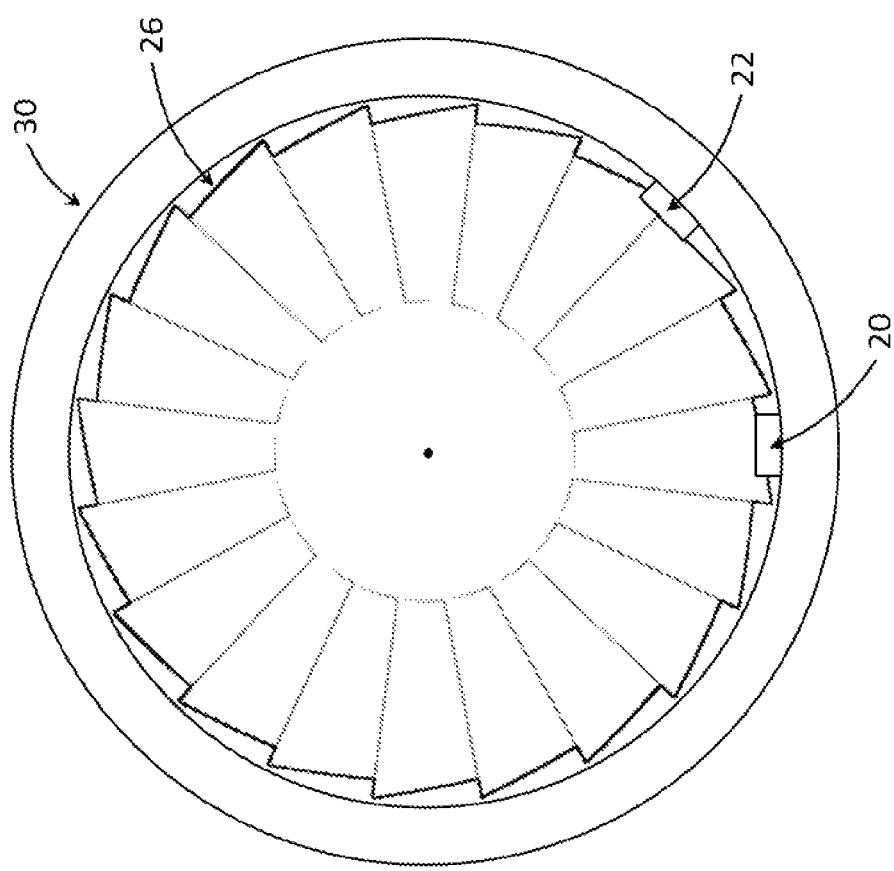
FIG. 2B is a schematic front view of the air intake of FIG. 2A.

Referring additionally to FIG. 2A and FIG. 2B of the drawings, which show a side view and front view respectively of a typical air intake duct 30 of a turbine assembly, with the front fan 26 and engine nose cone 28. A transmit antenna 20 and a receive antenna 22 are mounted at the entrance of the duct. In one exemplary embodiment, the antennas 20, 22 may be mounted on the duct itself, but in an alternative exemplary embodiment, they may be mounted within the inner surface of the turbine casing, and the present invention is not necessarily intended to be limited in this regard. Variations on this arrangement are possible. Antennas may be mounted further down the duct close to the front fan blades, shown by antenna 24, or within the engine itself. A single antenna may be used for both transmit and receive as in a monostatic radar.

The antennas may be provided in the form of an open ended waveguide assemblies mounted or embedded into the air duct or turbine casing, and connected to a remote antenna by means of, for example, a flexible coaxial connection. The proposed antenna is designed to minimise drag on the air flow through the duct and its design may be tilted or mounted flush to the surface of the duct. A dielectric window may be mounted over the waveguide opening to prevent debris from entering the waveguide during use and further prevent air flow drag. It should be recognised that there are many alternative types of antenna that could be used.

In one exemplary embodiment of the invention, the system uses a continuous wave (CW) signal operating at a frequency of 9.7 GHz and a wavelength of approximately 3 cm. A suitable power level is 200 microwatts. However, other signal types, of different frequencies are envisaged and the present invention is not necessarily intended to be limited in this regard.

Referring back to FIGS. 2A and 2B of the drawings, it will be appreciated that the signal returned to the antennas will include significant clutter. The principal clutter source will, of course, be from the compressor blades themselves, but another clutter source is from the area outside the entrance of the duct 30. In other words, the area of interest, i.e. the area within the duct 30, is affected by clutter originating at each end thereof.

In contrast, and in respect of the potential clutter that originates from outside of the duct 30 in particular, in a further exemplary embodiment of the present invention, a range gating pulse compression technique, which is intended to give the system a range resolution of substantially the same length as the air intake (for example, 2 meters), and sensitises the radar to objects within the air intake and reduces radar returns from the environment outside the engine. In a further exemplary embodiment the range gating uses pulse coding such as Binary Phase Shift Keying (BPSK) to produce a spread spectrum which together with using a low transmitter power, aims to minimise the probability of the radar causing interference to other aircraft systems. Furthermore, this aspect facilitates the use of LPI (Low Probability of Intercept) waveforms which may be required for some military applications.

The radar data generated by the system is dominated by the radar backscatter from the engine blades (known as Jet Engine Modulation or JEM). This signal is typically tens of dB greater in signal strength than that of the FOD and changes rapidly in amplitude and frequency as the jet engine changes speed. The system according this exemplary embodiment of the present invention is designed to remove, at least to a large extent, the JEM return, as described below.

A key inventive step is to recognise that on each complete rotation of the fan blades (i.e. one shaft rotation) the contribution of the JEM to the measured signal repeats while the contribution of the FOD to the measured signal continuously changes. The repetition of the JEM signal is approximate in that it is affected by changes in engine speed and vibration but is substantially similar on consecutive complete rotations of the blades.

Figure 3:
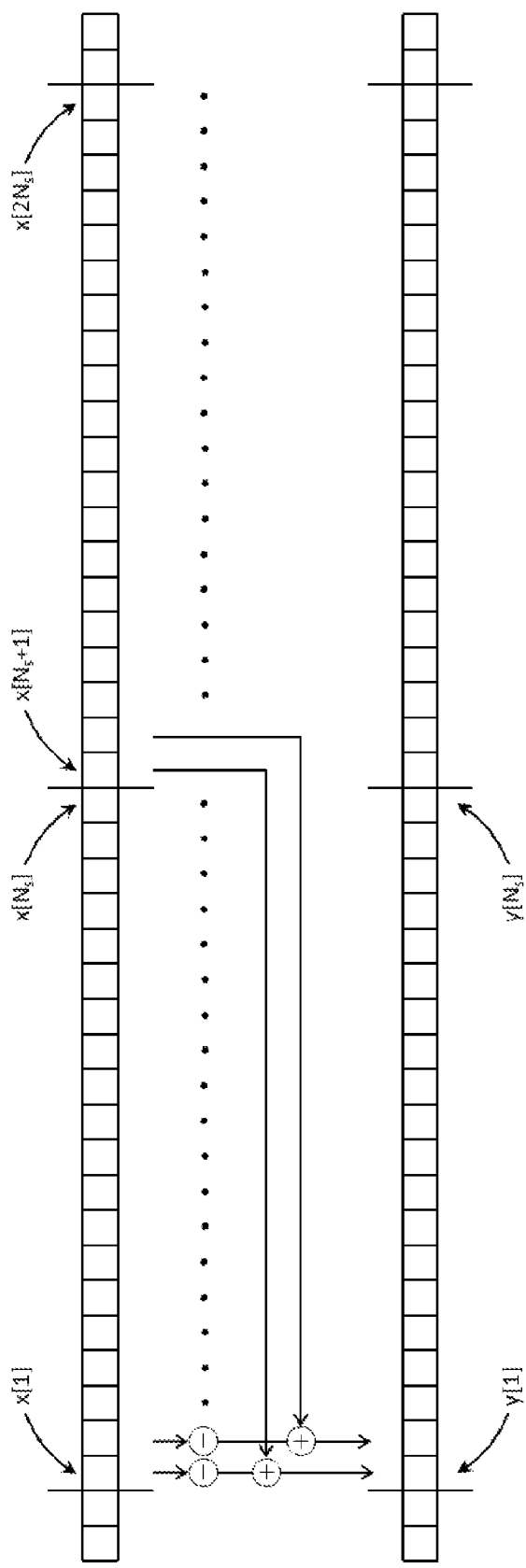
FIG. 3 is an illustration of an algorithm for removing the contribution of the JEM signal from the data according to an exemplary embodiment of the present invention.

Denoting the sequence of data sampled by the receiver as x, in a first aspect of the present invention a JEM suppressed signal y is generated for each complete shaft rotation by subtracting the samples from the previous rotation using the following calculation:

$$y[i]=x[i+N_s]-x[i] \text{ for } i=1 \text{ to } N,$$

where i is the sample number relative to the start of the current rotation and $N_s$ is the number of samples in the current single complete shaft rotation. The application of the above calculation is illustrated in FIG. 3.

The values of x are complex samples (i.e. I and Q in standard radar terminology) but could in principle be real numbers depending on the radar architecture.

In an exemplary embodiment, the comparison rotation data to subtract is an adjacent rotation either before or after the current rotation but could in principle be further away in the data.

In order to perform the above JEM suppression calculation it is first necessary to know very accurately the value of $N_s$. Standard aircraft engine monitoring systems can provide a once per revolution pulse however greater accuracy is ideally but not necessarily required.

In a second aspect of the present invention the value of $N_s$ is determined by selecting a reference section of the data, stepping the data section forward through the data samples, and at each step determining a measure of similarity. The greatest similarity occurs at sample number corresponding to one complete rotation of the shaft. In the preferred embodiment this calculation is performed in the form of a correlation but it should be recognised that many other comparison algorithms exist that could be used.

Denoting the comparison section of the data as f, the values of f are assigned by the following expression:

$$f[i]=x[i] \text{ for } j=1 \text{ to } N_f$$

Where, j is the sample number relative to the start of the current rotation. On the first iteration of the algorithm j=1 corresponds to an arbitrary sample position. $N_f$ is the number of samples in the section. It should be recognised that the start location of j could also be chosen elsewhere, for example so that the middle, rather than the start, of the section aligns with the start of the current rotation.

The length $N_f$ may be chosen less than or greater than an approximate estimate of the number of samples in a complete rotation. It should ideally at least contain the returns from multiple individual blades. It should also ideally contain at most a few complete shaft rotations because of changes in the engine speed.

Figure 4:
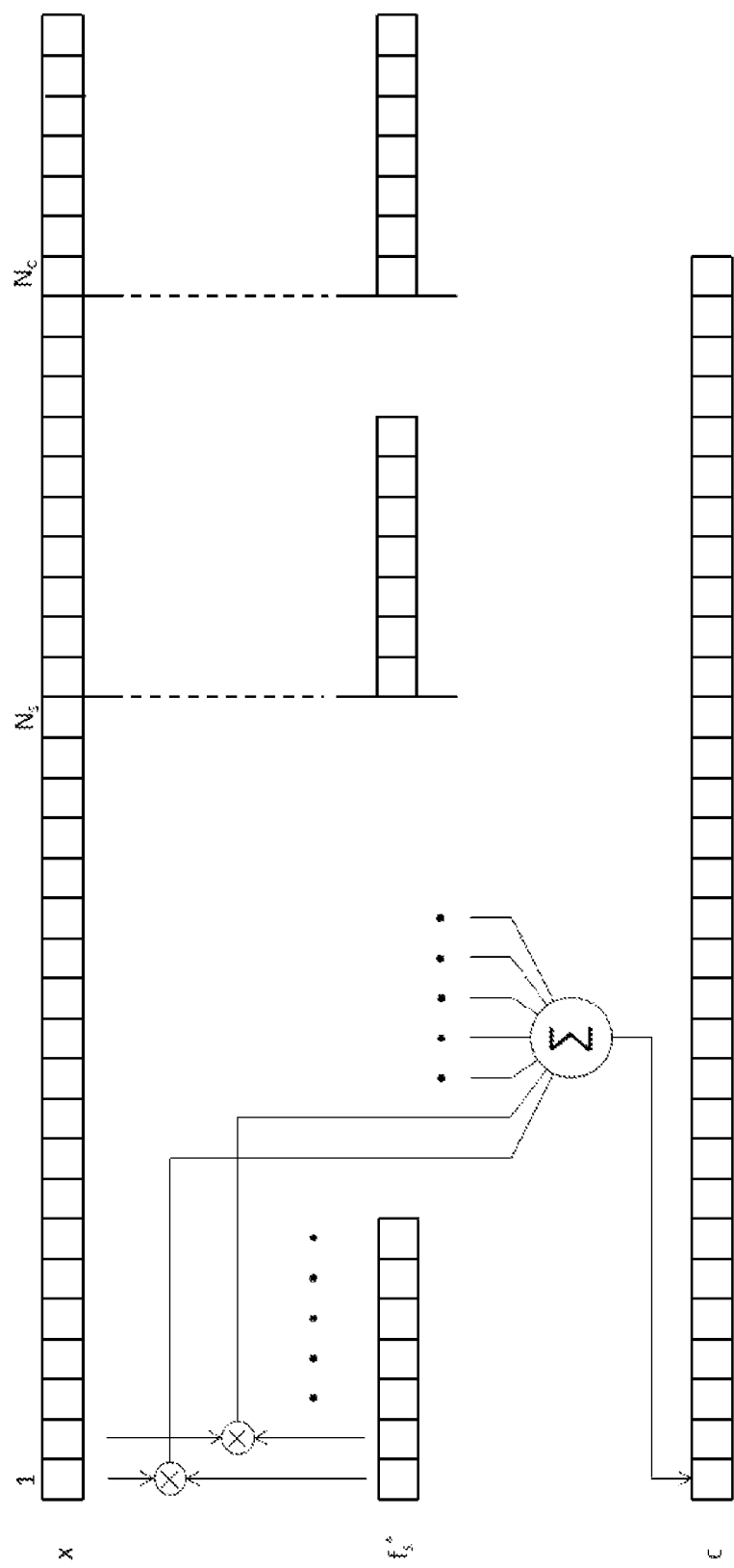
FIG. 4 is an illustration of an algorithm for identifying in the data a complete rotation of the engine blades according to an exemplary embodiment of the present invention.

Denoting the output of the correlation similarity algorithm as c, the values of c are calculated by the following expression:

$$c[n] = \sum_{m=1}^{N_f} f^*[m] \cdot x[m+n] \text{ for } n = 1 \text{ to } N_c$$

Where * denotes the complex conjugate, n is the sample number relative to the start of the current rotation and $N_c$ is the number of samples over which to search for a match. $N_c$ should be chosen to be greater than or equal to the maximum expected value of $N_s$. The application of the above calculation is illustrated in FIG. 4.

The magnitude of c gives a measure of the similarity over time. The sample position of the maximum value in the magnitude of c then gives a value for $N_s$ as required.

In a further aspect of the present invention the values of $N_f$ and $N_c$ are chosen by making use of the approximate value of $N_s$ provided by a once per revolution pulse provided by the aircraft engine monitoring system.

In a further aspect of the present invention an initial estimate of $N_s$ can be estimated based on measurements of $N_s$ from previous rotations. The estimate could for example simply be the previous measurement or alternatively be a linear prediction.

If an approximate value of $N_s$ is known the range of values for n in the calculation of c can be reduced in order to improve efficiency.

A limitation on the performance of the JEM suppression algorithm so far described is that when the engine is changing speed the number of samples in a complete rotation will change slightly from one rotation to the next.

In a further aspect of the present invention both the length of the current rotation (in samples) and the length of the matching rotation (in samples) are first determined by a correlation similarity algorithm and then matching rotation data is re-sampled by an interpolation algorithm to be the same length as the current rotation before performing the JEM removal by subtraction. In the preferred embodiment the interpolation algorithm is a standard Fourier interpolation which includes converting the data to the frequency domain using a Fast Fourier Transform (FFT), zero padding the data to the required data length and then converted back to the time domain using an Inverse FFT (IFFT). The re-sampling of the data can alternatively be performed by any suitable interpolation algorithm.

The length in samples to which to re-sample the data need not be the same as that of the current rotation. Both sets of data could be re-sampled to any length but that is ideally greater than or equal to the longer of the original data lengths and could be chosen to be a single fixed large value across all the data. After JEM removal it may then be desirable to re-sample each block of data back to its original length before performing further signal processing such as determining the velocity profile of the FOD.

A further inventive step is to recognise that the JEM removal by subtracting data from one rotation and a matching rotation is differencing the FOD signal at different times. The FOD signal has changed due to its motion and so is not removed from the data and so can be detected. However the measurement of the FOD is also distorted by the subtraction.

In a further embodiment of the invention the matching rotation data is the average of data from multiple rotations. This will increase the contribution from the JEM while relatively reducing the contribution from the FOD (which is changing and so does not combine additively) as well as reducing noise. The averaged matching rotation data is then subtracted from the data for the current rotation. The result is the removal of the JEM with only limited distortion of the FOD. For this method the multiple sets of rotation data that are averaged should ideally each be re-sampled, as described previously, to the same length to avoid changes over time due to changes in engine speed.

It should be recognised that the previous calculations have similar or equivalent operations once converted to the frequency domain by application of a Discrete Fourier Transform (DFT) or Fast Fourier Transform (FFT).

In an alternative embodiment of the invention the data for each complete shaft rotation is converted to the frequency domain. The JEM suppressed signal is generated by subtracting the samples from the previous rotation in the frequency domain. The FOD detection can then be performed directly in this frequency domain data or converted back to the time domain. As an alternative but less-optimal approach instead of the full subtraction, dominant harmonic lines could be set to zero or a mean value.

In another embodiment of the invention the number of samples in a complete rotation, $N_s$, is determined by converting a section of the data to the frequency domain, taking the magnitude of the spectrum, and finding the first large spectral line, which corresponds to the shaft rotation frequency.

In a further inventive step it is recognised that the JEM signal consists of a set of discrete harmonic spectral lines while the Doppler frequency component of the FOD changes over time so that in the duration of a processed set of data samples the FOD signal is present both at the frequencies of JEM spectral lines and at frequencies between the lines.

In a further embodiment of the invention the signal processor converts consecutive sections of the data, each of length ideally consisting of multiple shaft rotations, to the frequency domain to form a data set of frequency against time. The JEM spectral lines in the magnitude spectrum are then set to zero or a value which is the average over time at that frequency. The FOD can then be detected by applying a threshold. A disadvantage of this method compared to previously described methods is that the removal of the spectral lines also removes significant signal contributions from the FOD.

In a further embodiment of the invention the JEM spectral lines can be suppressed in the time domain by a standard comb notch filter where the comb filter is designed so that the notches in its frequency response are aligned with the JEM harmonic lines. The filter design is then varied with time to adjust for changes in engine speed. In an extension to this method the data is re-sampled, using the methods discussed previously, so that the data length for the shaft rotations is kept constant and thus allowing the use of a fixed design for the filter. A disadvantage of this method compared to the previously described methods is that the filter notches also remove significant signal contributions from the FOD.

It will be apparent to a person skilled in the art that modifications and variations can be made to the described embodiments, without departing from the scope of the invention, as claimed. For example, a FOD detection system including a module for suppressing the JEM clutter signal returns from the compressor blades may be included in an integrated engine health diagnostic system which uses radar to perform FOD detection and blade health monitoring. In this case, the one or more antennas required to receive returned signals from the air intake, and the one or more antennas required to receive returned signals from the compressor blades, may be mounted back-to-back at substantially the same location at the entrance to the turbine engine, with the FOD detection antenna(s) being directed toward the air intake, and the blade monitoring antenna(s) being directed toward the compressor blades. In an alternative exemplary embodiment, the two types of antenna may be embodied in a single phased array antenna, the radiation direction of which can be altered as required, depending on the area of the turbine assembly required to be monitored and the measurements required to be taken.

The invention claimed is:

1. A method for suppressing the Jet Engine Modulation (JEM) clutter signal returns from compressor blades in data sampled by a system for Foreign Object Debris (FOD) detection in the air intake of a turbine assembly, the method comprising the steps of:
    (a) identifying in the data, by a start-detection module comprising one or more processors, the start sample position and length in samples of a single complete shaft rotation; and
    (b) subtracting from a current rotation dataset, in a subtraction module comprising one or more processors, the samples from a comparison rotation dataset corresponding to another complete single shaft rotation.

2. The method according to claim 1, wherein said subtracting step comprises subtracting from a current rotation dataset the samples from a comparison rotation dataset corresponding to a previous complete single shaft rotation.

3. The method according to claim 1, wherein said identifying step uses a once per revolution pulse provided by an aircraft engine monitoring system as a reference to determine the position and length of a complete shaft rotation.

4. The method according to claim 1, wherein in said identifying step, the length of the current shaft rotation is determined by:
    (a) selecting a reference section of data starting at the start of the current shaft rotation;
    (b) stepping the reference section forward through the sampled data and at each step determining a measure of similarity, optionally implemented as a correlation; and
    (c) identifying the start of the next rotation by finding the sample number corresponding to the maximum measure of similarity.

5. The method according to claim 4, wherein, in said step of stepping the reference section forward, a once per revolution pulse provided by the aircraft engine monitoring system is used to reduce the range of samples over which to determine the measure of similarity.

6. The method according to claim 4, wherein, in said step of stepping the reference section forward, a prediction based on the number of samples in previous rotations is used to reduce the range of samples over which to determine the measure of similarity.

7. The method according to claim 1, wherein the length of the comparison rotation dataset is re-sampled to be substantially the same length as the current rotation before performing said subtracting step.

8. The method according to claim 1, wherein both the current rotation dataset and the comparison rotation dataset are re-sampled to the same length, and optionally wherein the resulting JEM suppressed data is re-sampled to the original length.

9. The method according to claim 1 where the comparison rotation dataset comprises the average of data from multiple rotations, optionally where the multiple rotations are re-sampled to be substantially the same length before averaging.

10. The method according to claim 1 wherein, prior to said step of identifying in the data the start sample position and length in samples of a single complete shaft rotation, both the current rotation dataset and the comparison rotation dataset are converted to the frequency domain.

11. A method for suppressing the Jet Engine Modulation (JEM) clutter signal returns from compressor blades in data sampled by a system for Foreign Object Foreign Debris (FOD) detection in the air intake of a turbine assembly, the method comprising the steps of:
    (a) identifying in the data, by a start-detection module comprising one or more processors, the start sample position and length in samples of a single complete shaft rotation;
    (b) converting the data for the single complete shaft rotation or multiples of a single shaft rotation to the frequency domain in a frequency domain conversion module comprising one or more processors; and
    (c) setting dominant JEM harmonic lines to zero or a mean value in a harmonic line module comprising one or more processors.

12. The method according to claim 1, wherein the number of samples in a complete rotation is determined by:
    (a) converting a section of the data to the frequency domain and taking the magnitude;
    (b) determining the frequency of the first large spectral line; and
    (c) calculating from the frequency the corresponding number of time samples for a complete rotation.

13. A method for suppressing the Jet Engine Modulation (JEM) clutter signal returns from compressor blades in data sampled by a radar designed to detect Foreign Object Foreign Debris (FOD) sucked into the engine air intake, method comprising the steps of:
    (a) determining, in the frequency domain, by a frequency domain frequency determination module comprising one or more processors, the frequency of the JEM lines which are at integer multiples of the shaft rotation frequency;
    (b) converting consecutive sections of the data to the frequency domain and taking their magnitude in a frequency domain magnitude module comprising one or more processors; and
    (c) providing a thresholding function and applying said thresholding function to said data by a thresholding function module comprising one or more processors, wherein said thresholding function is configured and/or said frequency spectrum is set so as to prevent said JEM frequencies from being detected by said thresholding function; and
    (d) the method optionally comprising the step of setting the frequency spectrum to zero or to a value which is the average over time at that frequency at the frequencies of the JEM spectral lines in a frequency spectrum setting module comprising one or more processors.

14. A method for suppressing the Jet Engine Modulation (JEM) clutter signal returns from compressor blades in data sampled by a radar designed to detect Foreign Object Debris (FOD) sucked into the engine air intake comprising the steps of:
    (a) determining, in the frequency domain, by a frequency-determination module comprising one or more processors, the frequency of the JEM lines which are at integer multiples of the shaft rotation frequency;

(b) calculating based on the frequency of the JEM lines, a comb notch filter, in a comb notch filter module, where the notches in the frequency response of the filter are aligned with the JEM harmonic lines; and (c) applying the notch filter to the data, and the method optionally further comprising one or more of the steps of:

(d) prior to the step of calculating the comb notch filter, resampling the data in a resampling module comprising one or more processors, so that each engine shaft rotation is represented in the same number of samples;

(e) determining by measurement in the frequency domain of the data, in a frequency domain line frequency module comprising one or more processors, the frequency of the JEM lines, and (f) determining the length in samples of a single shaft rotation and thereby obtain the corresponding frequency in the frequency domain of the JEM lines in a rotation length module comprising one or more processors.

15. A clutter suppression module for suppressing the Jet Engine Modulation (JEM) clutter signal returns from compressor blades in data sampled by a system for Foreign Object Debris (FOD) detection in the air intake of a turbine assembly, the module comprising one or more processors configured, in use, to perform the method of claim 1.

16. A system for Foreign Object Debris (FOD) detection in the air intake of a turbine assembly, comprising at least one antenna for obtaining data signals returned from the compressor blades of said turbine assembly, a sampling device for sampling said data signals to obtain sampled data, and the clutter suppression module for suppressing the JEM clutter signal according to claim 15.

17. An engine health diagnostic system for a turbine assembly, said engine health diagnostic system comprising a blade monitoring system for monitoring at least one characteristic of one or more blades of said turbine assembly, and a FOD detection system according to claim 16.

18. The engine health diagnostic system according to claim 17, wherein said blade monitoring system comprises at least one antenna directed at the compressor blades of said turbine assembly, and said FOD detection system comprises at least one antenna directed into the air intake of the turbine assembly.

19. The engine health monitoring system according to claim 18, wherein said at least one antenna of said blade monitoring system and said at least one antenna of said FOD detection system are mounted back-to-back in substantially the same location at the entrance to the engine of said turbine assembly.

20. The engine health diagnostic system according to claim 18, wherein said at least one antenna of said blade monitoring system and said at least one antenna of said FOD detection system are embodied in a single phased array antenna mounted at the entrance to the engine of said turbine assembly.

* * * * *